(12) United States Patent
Shiraishi (10) Patent No.: US 9,722,436 B2
(45) Date of Patent: *Aug. 1, 2017

(54) METHOD FOR EQUALIZING CAPACITIES OF ELECTRIC STORAGE DEVICES AND SYSTEM THEREOF

(71) Applicant: GS Yuasa International Ltd., Kyoto-shi (JP)

(72) Inventor: Takeyuki Shiraishi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 18 days.

This patent is subject to a terminal disclaimer.

(21) Appl. No.: 14/858,502

(22) Filed: Sep. 18, 2015

(65) Prior Publication Data

US 2016/0013669 A1    Jan. 14, 2016

Related U.S. Application Data

(63) Continuation of application No. 13/607,288, filed on Sep. 7, 2012, now Pat. No. 9,197,080.

(30) Foreign Application Priority Data

Sep. 9, 2011  (JP) ................... 2011-197336
Aug. 27, 2012  (JP) ................... 2012-186523

(51) Int. Cl.
  *H02J 7/00*    (2006.01)

(52) U.S. Cl.
  CPC ............ *H02J 7/0014* (2013.01); *H02J 7/007* (2013.01); *H02J 7/0021* (2013.01); *Y02E 60/122* (2013.01)

(58) Field of Classification Search
  CPC .......... H02J 7/0014; H02J 7/0021; H02J 7/00; H02J 7/0024; H02J 7/0068; H01M 2010/4271; Y02T 10/7044; Y02T 10/92

(Continued)

(56) References Cited

U.S. PATENT DOCUMENTS 5,780,994 A    7/1998  Sisemore
5,825,155 A    10/1998  Ito et al.
(Continued)

FOREIGN PATENT DOCUMENTS

EP    2 276 138 A2    1/2011
JP    2000-050516    2/2000
(Continued)

OTHER PUBLICATIONS

United States Office Action dated Dec. 29, 2014 in U.S. Appl. No. 13/607,288.

(Continued)

*Primary Examiner* — Nghia Doan
(74) *Attorney, Agent, or Firm* — McGinn IP Law Group, PLLC (57) ABSTRACT

A method for equalizing capacities of electric storage devices that are connected in series in an electric storage device assembly charged and discharged by a charger/discharger includes charging/discharging the electric storage device assembly at a charging/discharging rate of 1 C or lower, individually measuring voltages of the electric storage devices, respectively, determining whether a time rate of change in voltage of one electric storage device of the electric storage devices has reached a time-rate-of-change reference value and then a time rate of change in voltage of another electric storage device of the electric storage devices has reached the time-rate-of-change reference value, and individually discharging, based on a determining result, the electric storage device by a discharging circuit provided separately from the discharger.

7 Claims, 10 Drawing Sheets

(58) Field of Classification Search
USPC .................................. 320/107, 127, 130, 134
See application file for complete search history.

(56) References Cited

U.S. PATENT DOCUMENTS

| | | | |
|---|---|---|---|
| 5,905,360 | A | 5/1999 | Ukita |
| 7,880,444 | B2 | 2/2011 | Pellenc |
| 7,888,910 | B2 | 2/2011 | Zeng |
| 2005/0170256 | A1 | 8/2005 | Cummings |
| 2010/0194339 | A1 | 8/2010 | Yang et al. |
| 2011/0011653 | A1* | 1/2011 | Mizutani ............ B60L 11/1864 180/65.1 |
| 2011/0025124 | A1* | 2/2011 | Brabec ............... B60L 11/1861 307/9.1 |
| 2011/0267002 | A1* | 11/2011 | Baarman .............. H02J 7/0072 320/108 |
| 2012/0293003 | A1 | 11/2012 | Shimamura et al. |

FOREIGN PATENT DOCUMENTS

| | | |
|---|---|---|
| JP | 2011-019329 A | 1/2011 |
| WO | WO 2011/102241 A1 | 8/2011 |

OTHER PUBLICATIONS

United States Office Action dated May 15, 2015 in U.S. Appl. No. 13/607,288.
Unites States Notice of Allowance dated Jul. 27, 2015 in U.S. Appl. No. 13/607,288.
Unites States Office Action dated Jun. 23, 2015 in U.S. Appl. No. 13/607,299.
Unites States Office Action Dated Feb. 4, 2015 in U.S. Appl. No. 13/607,299.
Extended European Search Report dated Feb. 11, 2015 with an English Translation.
European Search report dated Oct. 12, 2016.

* cited by examiner

METHOD FOR EQUALIZING CAPACITIES OF ELECTRIC STORAGE DEVICES AND SYSTEM THEREOF

The present application is a Continuation Application of U.S. patent application Ser. No. 13/607,288, filed on Sep. 7, 2012, which is based on and claims priority from Japanese Patent Applications No. 2011-197336, filed on Sep. 9, 2011, and No. 2012-186523, filed on Aug. 27, 2012, the entire contents of which are incorporated herein by reference.

TECHNICAL FIELD

The invention disclosed in this specification relates to a technology of equalizing capacities of a plurality of electric storage devices under charging or discharging.

BACKGROUND

Rechargeable electric storage devices have been used. The electric storage devices can be repeatedly used by charging and discharging. Therefore, the electric storage devices are eco-friendly in comparison to non-rechargeable batteries and thus currently used in various fields including electric vehicles.

In a device including a plurality of electric storage devices, capacities of the electric storage devices may not be equal due to variations in initial capacity or different deterioration speeds. Some of the electric storage devices may reach a full-charge voltage earlier or later than the other electric storage devices. Therefore, some of the electric storage devices may not be fully charged. Further, in discharging, some of the electric storage devices may reach a discharging termination voltage and thus the discharging may be terminated earlier or later than the other electric storage devices. Therefore, power stored in some of the electric storage devices may not be fully used. Thus, if the capacities of the electric storage devices are not equal, those capacities cannot be fully utilized. A technology for discharging the secondary batteries with uneven capacities by a discharging circuit has been known. The discharging circuit including a resistor is provided for equalizing the capacities of the electric storage devices. According to the technology, remaining capacities of the electric storage devices are determined based on information on voltages of the secondary batteries. The information is obtained while no currents flow through the electric storage devices. The electric storage devices are discharged based on differences in capacity to equalize the capacities.

Recently, an olivine-type lithium-ion iron secondary battery (hereinafter referred to as an olivine-type iron battery) draws attention as a secondary battery for electric vehicles. The olivine-type iron battery is a kind of lithium-ion batteries and has a positive electrode made of olivine-type iron phosphate and a negative electrode made of, for example, a graphite-based material. Since the olivine-type iron battery need not use a cobalt-based material as its electrode, it is more inexpensive and safer than a secondary battery that uses a cobalt-based electrode.

The olivine-type iron battery is known to have a region (hereinafter referred to as a variation region) where a voltage sharply increases with respect to an increase in a remaining capacity. If the olivine-type iron battery having a negative electrode made of a graphite-based material, the battery has a variation region in which an SOC indicating the remaining capacity of a secondary battery is lower than 10% and another variation region in which the SOC is equal to or higher than 90%. Since the battery has the variation region where the SOC is relatively high or low, even if equalization of the capacities of electric storage devices are performed based on voltage information of the electric storage devices in the variation region, the SOCs of the electric storage devices reach about 100% or about 0% before the capacities of the electric storage devices are equalized. As a result, the charging or the discharging of the electric storage devices may be terminated. If the charging or the discharging of the electric storage devices is terminated, the equalization of the capacities of the electric storage devices may also be terminated. Therefore, the capacities may not be sufficiently equalized. Accordingly, a technology for equalizing the capacities of the electric storage devices using a region other than the variation regions is needed.

The olivine-type iron battery is known to have a plateau region in combination with the negative electrode. For example, when the negative electrode is made of a graphite-based material, the olivine-type iron battery may have a plateau region including an SOC value, which indicates the remaining capacity of secondary batteries, of 10% to 90%. In this context, the plateau region refers to a region where the voltage of a secondary battery stays substantially constant irrespective of changes in SOC of the secondary battery. In the electric storage devices such as the secondary battery having a plateau region, the capacities of the electric storage devices may not be easily estimated based on voltage information of the electric storage devices obtained in the plateau region and, therefore, the capacities of the electric storage devices may not be properly equalized.

SUMMARY

An electric storage device management apparatus described herein is provided for monitoring an electric storage device assembly charged and discharged by a charger/discharger. The electric storage device assembly includes a plurality of electric storage devices connected in series. The electric storage device management apparatus includes a voltmeter, a discharging circuit, and a controller. The voltmeter is configured to measure voltages of the electric storage devices, respectively. The discharging circuit is provided separately from the charger/discharge and configured to discharge the electric storage devices individually.

The controller is configured to: determine whether a unit time variation in voltage of a first electric storage device of the electric storage devices has increased to a reference value and a unit time variation in voltage of a second electric storage device of the electric storage devices has increased to the reference value; measure an elapsed time period since the unit time variation of the first electric storage device has increased to the reference value; and control the discharging circuit to discharge the electric storage devices based on the elapsed time period such that capacities of the electric storage devices are equalized.

According to technologies described herein, capacities of electric storage devices under charging or discharging can be equalized.

DETAILED DESCRIPTION

First Embodiment

A first embodiment will be described with reference to FIGS. 1 to 6.

1. Configuration of a Battery Management System

Figure 1:
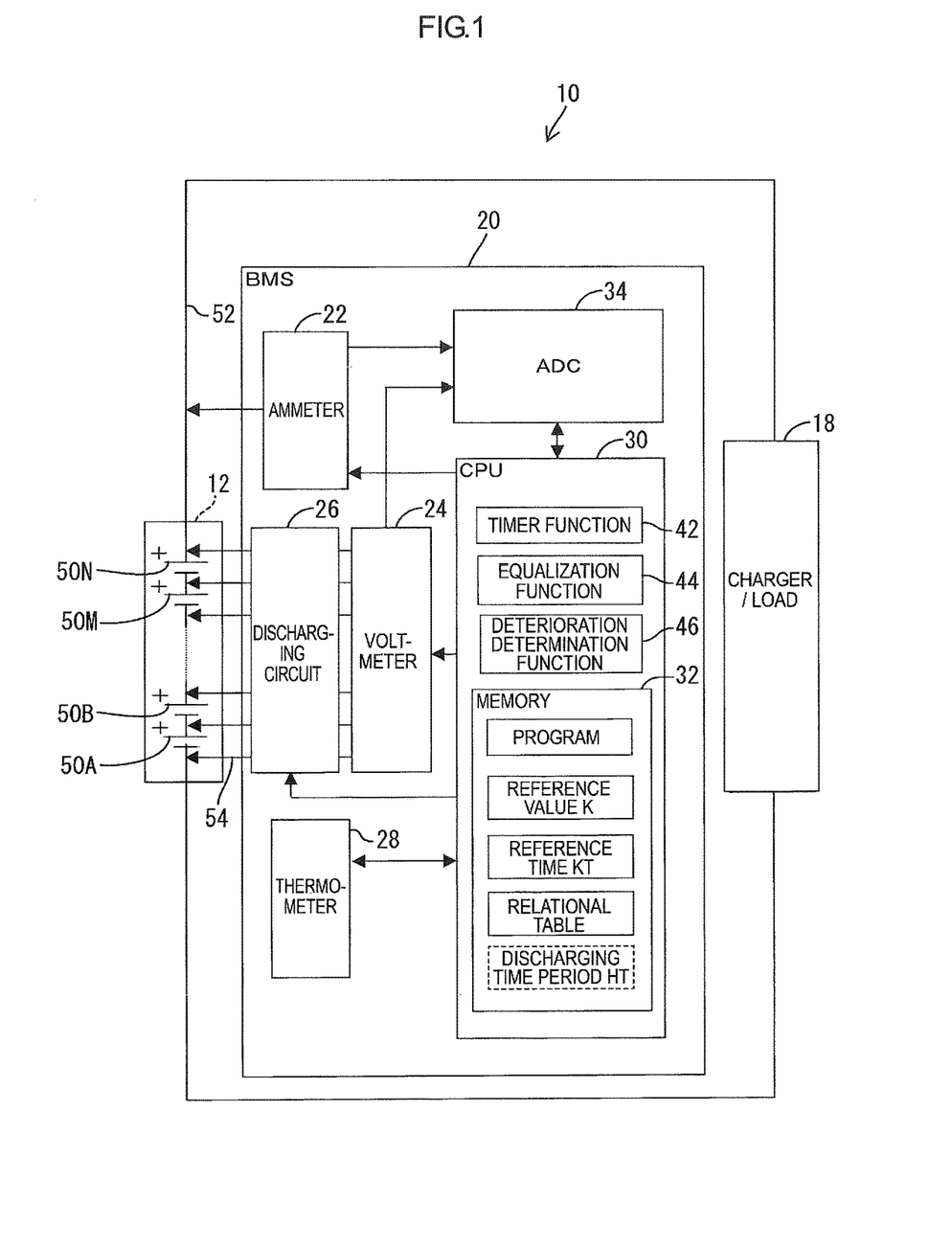
FIG. 1 is a block diagram of a charging and discharging apparatus.

As illustrated in FIG. 1, a charging and discharging system 10 includes a battery assembly 12, a battery management system (BMS) 20, and a charger/load 18. The battery management system corresponds to an electric storage device management apparatus. The battery assembly 12 may be mounted on an electric vehicle. The battery assembly 12 includes a plurality of secondary batteries 50 (electric storage devices) connected in series. The charger/load 18 is provided inside or outside of the electric vehicle. The battery assembly 12 is charged with a constant current when connected to the charger of the charger/load 18. The battery assembly 12 is discharged with a constant current when connected to the load of the charger-load 18. The BMS 20 monitors voltages V and currents I of the secondary batteries 50 in the battery assembly 12 under charging. The BMS 20 controls remaining capacities (or SOCs) of the secondary batteries 50 based on the monitoring results, and equalizes the SOCs of the secondary batteries 50. The remaining capacities or the SOCs indicate states of charge or discharge of the secondary batteries 50.

Figure 4:
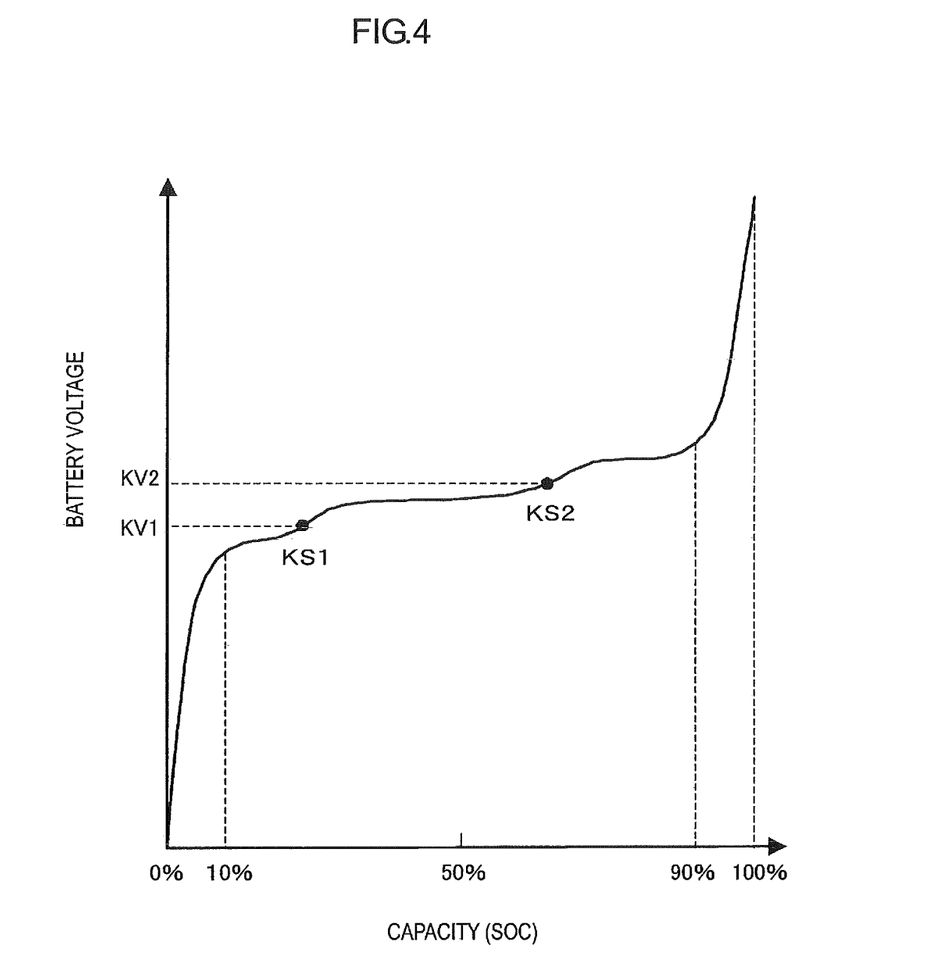
FIG. 4 is a graph illustrating charging and discharging characteristics of secondary batteries.

Olivine-type lithium-ion iron secondary batteries (hereinafter referred to as olivine-type iron batteries) are used for the secondary batteries 50. The secondary batteries 50 are a kind of lithium-ion batteries. A positive electrode and a negative electrode of each secondary battery 50 are made of olivine-type iron phosphate and a graphite material, respectively. As illustrated in FIG. 4, the voltage of the secondary battery 50 sharply rises in a first region in which the SOC is lower than 10% and a second region in which SOC is 90% or higher. The first region is in an early stage of charging (or a final stage of discharging) and the second region is in a final stage of charging (or an early stage of discharging). The voltage of the secondary battery 50 is substantially constant in a third region in which the SOC is in a range from 10% to 90% (hereinafter referred to as plateau region). The third region is in an intermediate stage of charging or discharging.

The BMS 20 includes a central processing unit (CPU) 30, an analog-digital converter (ADC) 34, an ammeter 22, a voltmeter 24, a discharging circuit 26, and a thermometer 28.

The CPU 30 has a built-in memory 32 such as ROM or RAM. In the memory 32, various kinds of programs for controlling operations of each components of the BMS 20 are stored. The CPU 30 includes a timer function, an equalization control function, and a deterioration determination function. These functions of the CPU 30 are illustrated in FIG. 1 as functional blocks, 42, 44, and 46, respectively. The CPU 30 reads the programs from the memory 32 and controls the components in the BMS 20 such as the discharging circuit 26.

Figure 2:
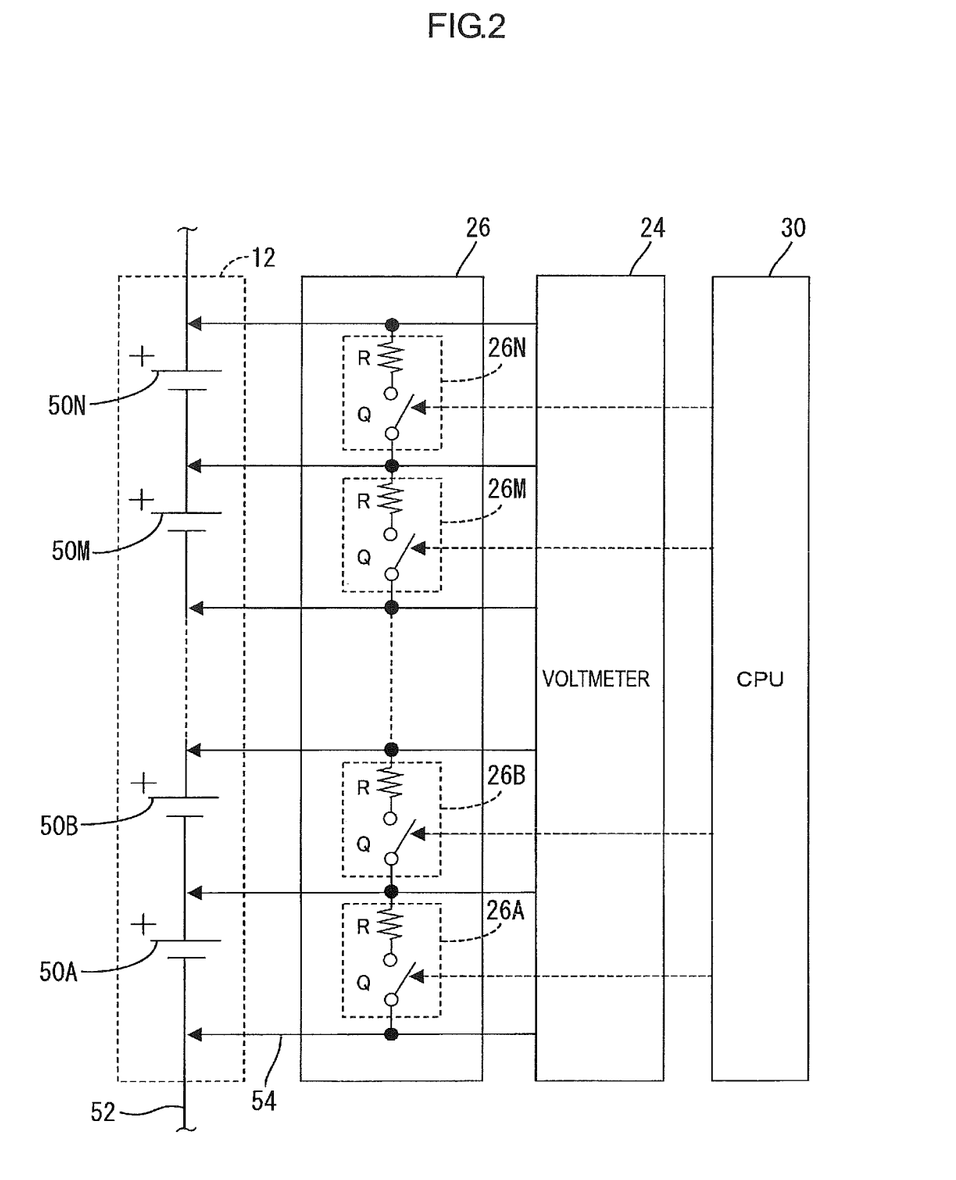
FIG. 2 is a schematic diagram of a discharging circuit.

The thermometer 28 is a contact-type or a non-contact-type thermometer provided for measuring a temperature of the battery assembly 12. The measured temperature is stored in the memory 32. As illustrated in FIG. 2, the voltmeter 24 is connected to both ends of each of the secondary batteries 50 via wirings 54. The voltmeter 24 measures a voltage V of each secondary battery 50 for each predetermined period during charging and discharging. The battery assembly 12 includes multiple secondary batteries 50A, 50B, . . . , and 50N. The voltmeter 24 measures voltages VA, VB, . . . , and VN of the respective secondary batteries 50. The voltmeter 24 sends the measurements of the voltages V to the ADC 34.

The discharging circuit 26 is connected to wirings 54 that connects the voltmeter 24 to the secondary batteries 50. The discharging circuit 26 discharges the secondary batteries 50 individually. As illustrated in FIG. 2, the discharging circuit 26 includes individual discharging circuits 26A, 26B, . . . , and 26N for discharging the secondary batteries 50, respectively. Each individual discharge circuit 26A, 26B, . . . , or 26N is connected between the wirings 54 includes a resistor R and a switch Q. Closing or opening of the switch Q of the discharging circuit 26 is controlled by the CPU 30. When the switch Q is closed by the CPU 30, a current flows from the secondary battery 50 via the wirings 54 and the resistor R. Therefore, the secondary battery 50 is discharged. When the switch Q is opened, the discharging of the corresponding secondary battery 50 stops.

The ammeter 22 measures a current that flows through wirings 52 that connect the battery assembly 12 to the charger 18. The ammeter 22 also measures a charging/discharging current ZI that flows through all of the secondary batteries 50. Further, the ammeter 22 measures a current HI (or an equalization discharging current) flowing from each secondary battery 50 via the wirings 54. Specifically, the ammeter 22 measures currents IA, IB, . . . , and IN flowing from the secondary batteries 50A, 50B, . . . , and 50N, respectively. The ammeter 22 sends the measurements of the currents I to the ADC 34.

The ADC 34 is connected to the ammeter 22, the voltmeter 24, and the CPU 30. The ADC 34 receives analog data on the currents I and the voltages V from the ammeter 22 and the voltmeter 24, and converts the analog data to digital data. The digital data on the currents I and the voltages V is stored in the memory 32. The CPU 30 executes an equalization process, which will be described later, using the data on the currents I and voltages V stored in the memory 32.

2. Equalization Process

Figure 3:
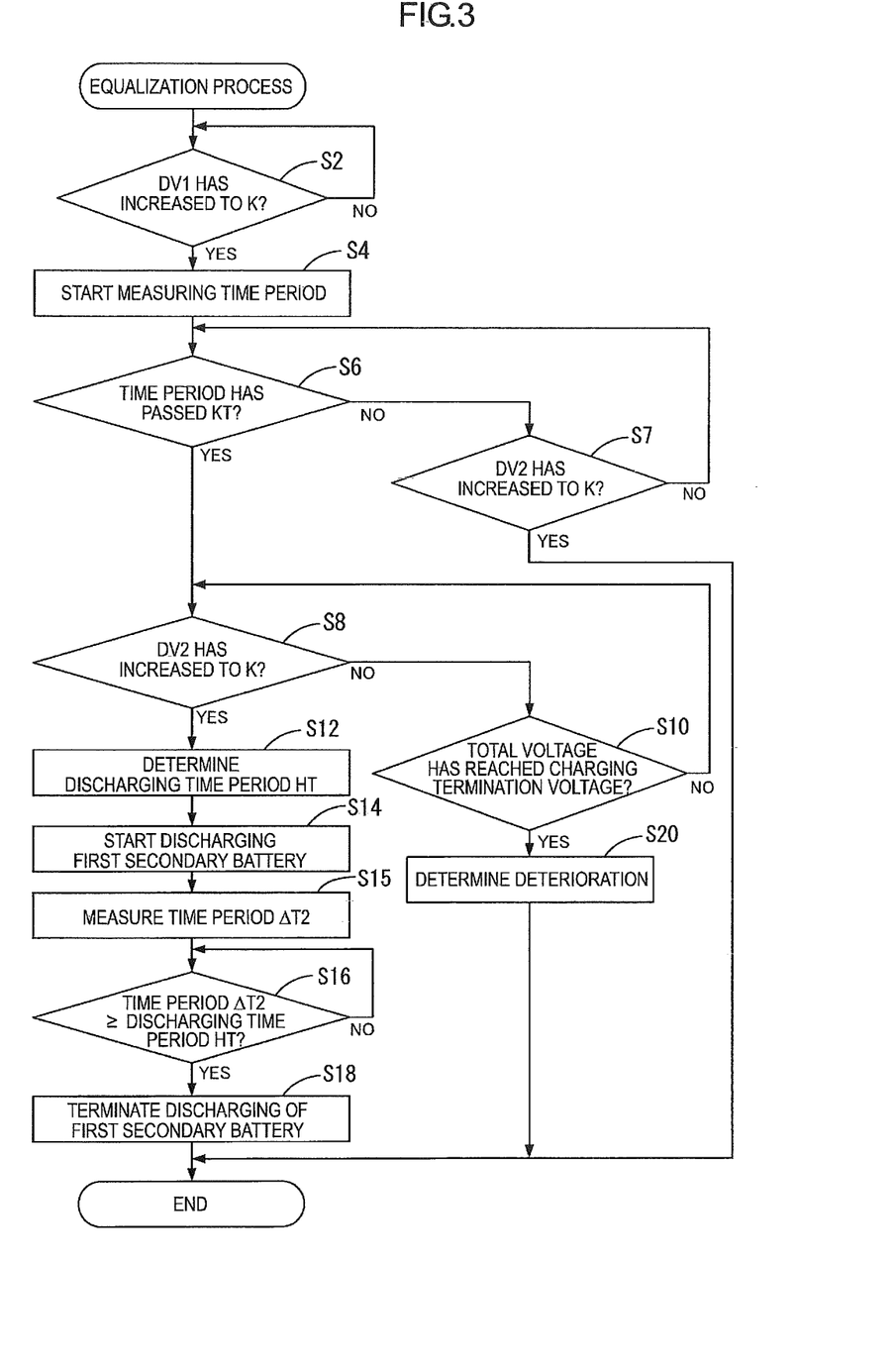
FIG. 3 is a flowchart illustrating an equalization control process according to a first embodiment.

An equalization process performed by the BMS 20 during the charging of the battery assembly 12 will be explained with reference to FIGS. 3 and 6. In this embodiment, the battery assembly 12 is charged with a constant current at a 0.5 C charge rate, that is, at a low speed charge rate. The equalization process is executed associated with a charging control process for controlling the charging of the battery assembly 12. The equalization process is executed according to a flowchart illustrated in FIG. 3.

When the battery assembly 12 is connected to the charger of the charger/load 18 by a user and power supply from the charger/load 18 to the battery assembly 12 is started, the CPU 30 executes the charging control process and the equalization process. The CPU 30 repeatedly monitors a voltage V of each secondary battery 50 every determined time period of ΔX. The CPU 30 calculates a unit time variation DV in voltage V by dividing an absolute value of a difference in voltage V between consecutive measurements by the determined time period of ΔX. The CPU 30 determines whether the calculated unit time variation DV is larger than a reference value K (K>0).

In the plateau region, the voltage V of the secondary battery 50 stays substantially constant regardless of variations in SOC. Even if the voltage V of the secondary battery 50 exceeds the reference voltage, the SOC of the secondary battery 50 cannot be accurately estimated.

Figure 5:
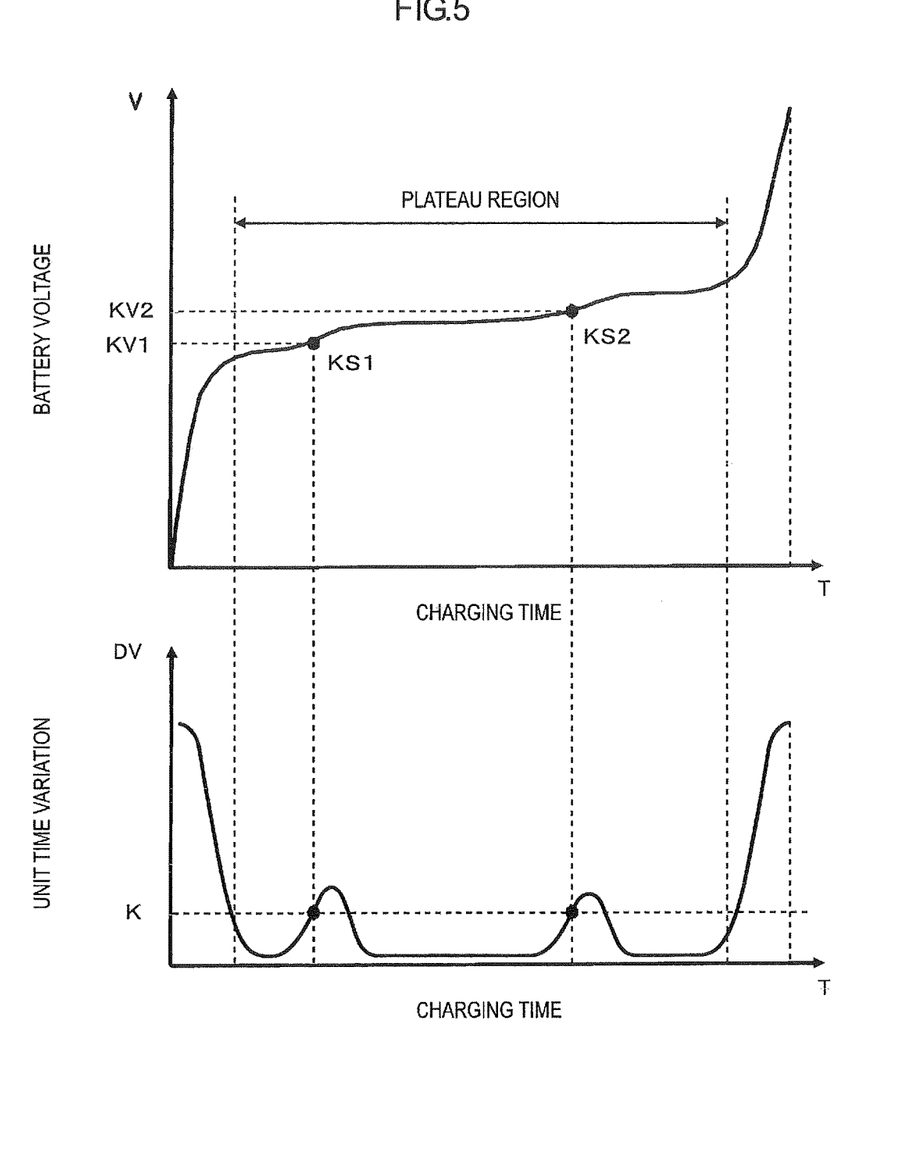
FIG. 5 is a graph illustrating charging and discharging characteristics of secondary batteries.

In the plateau region of the olivine-type iron battery having the negative electrode including graphite-based material, the unit time variation DV of the secondary battery 50 under charging greatly increases at some points. As illustrated in FIG. 5, the unit time variation DV is larger than the reference value K at two points KS1 and KS2 in the plateau region. The voltage V at the KS 2 is larger than the voltage V at the point KS1. In the following description, procedures in which the CPU 30 determines whether the voltage V has increased to a reference voltage KV2 that is a voltage at the point KS2 and whether the unit time variation DV has increased to the reference value K will be explained. The same procedures may be used for the point KS1.

If the unit time variation DV of any one of the secondary batteries 50 has increased to the reference value K, the CPU 30 starts measuring a time period. The CPU 30 measures a time period ΔT from when the unit time variation DV of one of the secondary batteries 50 has increased to the reference value K to when the unit time variation DV of another secondary battery 50 has increased to the reference value K. The CPU 30 compares the time period ΔT with a reference time period KT stored in the memory 32.

In the following description, the secondary battery 50, the unit time voltage DV of which has increased to the reference value K the fastest, may be referred to as a first secondary battery 50. Furthermore, the secondary battery 50, the unit time voltage DV of which has increased to the reference value K the slowest, may be referred to as a second secondary battery 50. The equalization process for the first secondary battery 50 and the second secondary battery 50 will be explained. Namely, the voltage V of the first secondary battery 50 increases to the voltage at the point KS2 the fastest among the secondary batteries 50 (i.e., the SOC of the first secondary battery 50 is the highest). The voltage V of the second secondary battery 50 increases to the voltage at the point KS2 the slowest among the secondary batteries 50 (i.e., the SOC of the first secondary battery 50 is the lowest).

Figure 6:
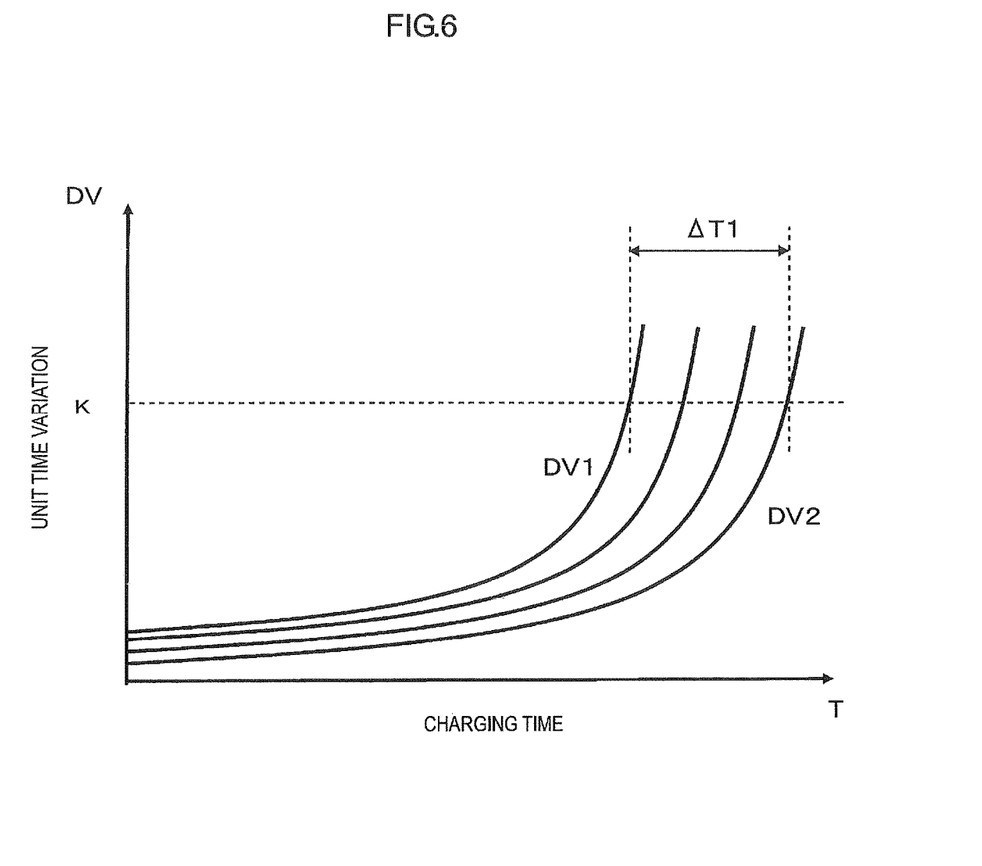
FIG. 6 is a graph illustrating charging and discharging characteristics of secondary batteries.

As illustrated in FIG. 6, the unit time variations of the first secondary battery 50 and the second secondary battery 50 are denoted by DV1 and DV2, respectively. The time period from when the unit time variation DV1 has increased to the reference value K to when the unit time variation DV2 has increased to the reference value K is denoted by ΔT1. The configuration of the first secondary battery 50 described in the following sections may be applied to other secondary batteries 50 so that the configurations of all secondary batteries 50 are considered to be described.

The CPU 30 receives information on a charging and discharging rate of 0.5 C and determines whether the unit time variation DV1 of the first secondary battery 50 has increased to the reference value K (S2). The charging rate of 0.5 C is at which the secondary battery assembly 12 is charged with a constant current. If the unit time variation DV1 has not increased to the reference value K (NO in S2), the CPU 30 continues monitoring the unit time variation DV1. If the unit time variation DV1 has increased to the reference value K (YES in S2), the CPU 30 starts measuring a time period (S4).

The CPU 30 determines whether the measured time period has passed the reference time period KT (S6). If the time period has not passed the reference time period KT (NO in S6), the CPU 30 determines whether the unit time variation DV2 of the second secondary battery 50 has increased to the reference value K (S7). If the unit time variation DV2 has not increased to the reference value K (NO in S7), the CPU 30 continues monitoring the unit time variation DV2. If the unit time variation DV2 has increased to the reference value K (YES in S7) before the measured time period has passed the reference time reference time period KT, the CPU 30 determines that the first secondary battery 50 and the second secondary battery 50 are equally charged. Then, the CPU 30 terminates the equalization process without discharging the first and the second batteries 50.

If the time period has passed the reference time period KT (YES in S6), the CPU 30 determines whether the unit time variation DV2 of the second secondary battery 50 has increased to the reference value K (S8). If the unit time variation DV2 has not increased to the reference value K (NO in S8), the CPU 30 determines whether a total voltage of the second batteries 50 has reached a charging termination voltage (S10). If the total voltage has not reached the charging termination voltage (NO in S10), the CPU 30 continues monitoring the unit time variation DV2 of the second secondary battery 50 and the total voltage.

If the total voltage has reached the charging termination voltage (YES in S10), the CPU 30 determines that deterioration of the second secondary battery 50 has progressed further than the first secondary battery 50 and the battery assembly 12 has reached the end of lifetime (S20). The CPU 30 issues a warning to notify a user of the deterioration of the battery assembly 12 and battery replacement through a display or any other warning device. Then, the CPU 30 terminates the equalization process.

If the unit time variation DV2 has increased to the reference value K (YES in S8), the CPU 30 determines that the first secondary battery 50 and the second secondary battery 50 are not equally charged. The CPU 30 determines a discharging time period HT for which the first secondary battery 50 is discharged to equalize the SOCs of the first secondary battery 50 and the second secondary battery 50. The charging time period HT is also referred to as an equalization control time period determined for equalizing the SOCs of the first secondary battery 50 and the second secondary battery 50.

A relational table including the time period ΔT1 and discharging time periods associated with each other is stored in the memory 32 of the CPU 30 in advance. The CPU 30 determines the discharging time period HT based on the time period ΔT1 and the relational table (S12). Then, the CPU 30 controls the discharging circuit 26 to start discharging the first secondary battery 50 (S14). Specifically, the CPU 30 closes the switch Q of one of the individual discharging circuits 26A to 26N, which is provided for the first second battery 50. The CPU 30 measures the time period ΔT2 since the switch Q is closed (S15). The CPU 30 determines whether the time period ΔT2 has passed the discharging time period HT (S16). If the time period ΔT2 has not passed the discharging time period HT (NO in S16), the CPU 30 continues monitoring the time period ΔT2. If the time period ΔT2 has passed the charging time period HT (YES in S16), the CPU 30 controls the discharging circuit 26 to terminate the discharging of the first secondary battery 50 (S18), and terminates the equalization process.

3. Effects (1) The BMS 20 measures the voltage V of the second secondary battery 50 under charging and calculates the unit time variation DV based on the voltage V. The BMS 20 controls the equalization of the secondary batteries 50 using the time period ΔT1. The time period ΔT1 is from when the unit time variation DV of a first secondary battery has increased to the reference value K to when the unit time variation of a second secondary battery has increased to the reference value K. With the BMS 20, the secondary batteries 50 can be charged at an equalized SOC even in the plateau region in which the equalization control of the secondary batteries based on the voltage V is difficult.

Especially, the olivine-type lithium-ion iron secondary batteries are used in the charging and discharging system 10. These batteries have a plateau region that extends from a point at which the SOC is 10% to a point at which the SOC is 90%. In a region in which the SOC is 90% or higher, that is, in a final stage of charging, the battery voltage sharply rises for a slight increase in SOC. If the equalization is performed on the secondary batteries 50 based on the voltage V, the SOC tends to quickly reach substantially 100% because only a slight increase is required to reach 100%. Therefore, the equalization process cannot be complete for the secondary batteries 50. The plateau region may be preferable to be used for the equalization of the secondary batteries 50 because the SOC is lower in the plateau region than in the final stage of charging.

The BMS 20 controls discharging of the secondary batteries 50 using the unit time variation DV. Each of the olivine-type lithium-ion iron secondary batteries has the negative electrode including a graphite-based material. The unit time variation DV of the secondary battery 50 under charging greatly increases further than the reference value K at the points KS1 and KS2. The SOC of the secondary battery 50 can be estimated based on the unit time variations DV at the points KS1 and KS2. The equalization of the secondary batteries 50 can be completed by a single equalization process using the plateau region and the secondary batteries 50 can be charged.

(2) The BMS 20 discharges the first secondary battery 50 if the time period ΔT1 is equal to or longer than the reference time period KT. Generally, the time period ΔT1 indicates a difference between the SOC of the first secondary battery 50 and the SOC of the second secondary battery 50. According to the BMS 20, the first secondary battery 50 is charged if the time period ΔT1 is equal to or longer than the reference time KT. Therefore, the difference in SOC between the first secondary battery 50 and the second secondary battery 50 during the charging of the battery assembly 12 is maintained within a certain capacity variation corresponding to the reference time period KT.

(3) According to the BMS 20, the discharging time HT for equalizing the capacity of the first secondary battery 50 is determined using the time period ΔT1 corresponding to the difference in SOC between the first secondary battery 50 and the second secondary battery 50. Therefore, the discharging time HT can be accurately determined and the SOCs of the first secondary battery 50 and the second secondary battery 50 under charging can be equalized.

(4) The BMS 20 determines that the first secondary battery 50 and the second secondary battery 50 are not equally charged if the time period ΔT1 is equal to or longer than the reference time period KT. Under such a condition, the first secondary battery 50 is discharged. Therefore, the secondary batteries 50 in the battery assembly 12 under charging can be equally charged.

(5) The total voltage of the secondary batteries 50 may reach the charging termination voltage and the charging may be terminated before the unit time variation DV2 of the second secondary battery 50 increases to the reference value K. In such a case, the BMS 20 determines that the second secondary battery 50 may be deteriorated and the SOCs of the first secondary battery 50 and the second secondary battery 50 cannot be equalized. Therefore, the battery assembly 12 including the deteriorated secondary battery 50 is less likely to be used.

(6) The BMS 20 determines whether the unit time variation DV has increased to the reference value K. Furthermore, the BMS 20 determines whether the voltages V of the secondary batteries have reached the reference voltage KV2. If the voltage V2 of the second secondary battery 50 reaches the point KS1 after the voltage V1 of the first secondary battery 50 has reached KS2, the time period therebetween is not measured. A time period between when the voltage V of one of the secondary batteries 50 has reached the point and when the voltage V of another one of the secondary batteries 50 has reached the same point is measured. Therefore, the capacities of the second batteries 50 are less likely to be improperly equalized.

(7) The battery assembly 12 is charged with a constant current at a 0.5 C charge rate. In comparison to a configuration in which a battery assembly is charged at a 10 charge rate or 0.9 or higher charge rate, which is a relatively high charge speed, the unit time variation is larger. If the unit time variation DV caused by deterioration decreases, the determination whether the unit time variation DV has increased to the reference value K is difficult. Because the second batteries 50 are charged at a relatively low charge rate in this embodiment, whether the unit time variation DV has increased to the reference value K can be easily determined.

Second Embodiment

A second embodiment will be described with reference to FIG. 7. Specifically, an equalization process executed by the charging and discharging system 10 associated with a discharging control process will be described.

The battery assembly 12 is under constant discharging. In the following description, procedures in which the CPU 30 determines whether the voltage V has decreased to the reference voltage KV1 that is a voltage at the point KS1 and whether the unit time variation DV has increased to the reference value K will be explained.

Furthermore, as in the first embodiment, the secondary battery 50, the unit time voltage DV of which has increased to the reference value K the fastest, may be referred to as a first secondary battery 50. Furthermore, the secondary battery 50, the unit time voltage DV of which has increased to the reference value K the slowest, may be referred to as a second secondary battery 50. The equalization process for the first secondary battery 50 and the second secondary battery 50 will be explained. Namely, the voltage V of the first secondary battery 50 decreases the fastest among the secondary batteries 50 (i.e., the SOC of the first secondary battery 50 is the lowest). The voltage V of the second secondary battery 50 decreases the slowest among the secondary batteries 50 (i.e., the SOC of the first secondary battery 50 is the highest). The same configurations as the first embodiment will not be explained.

1. Equalization Process

Figure 7:
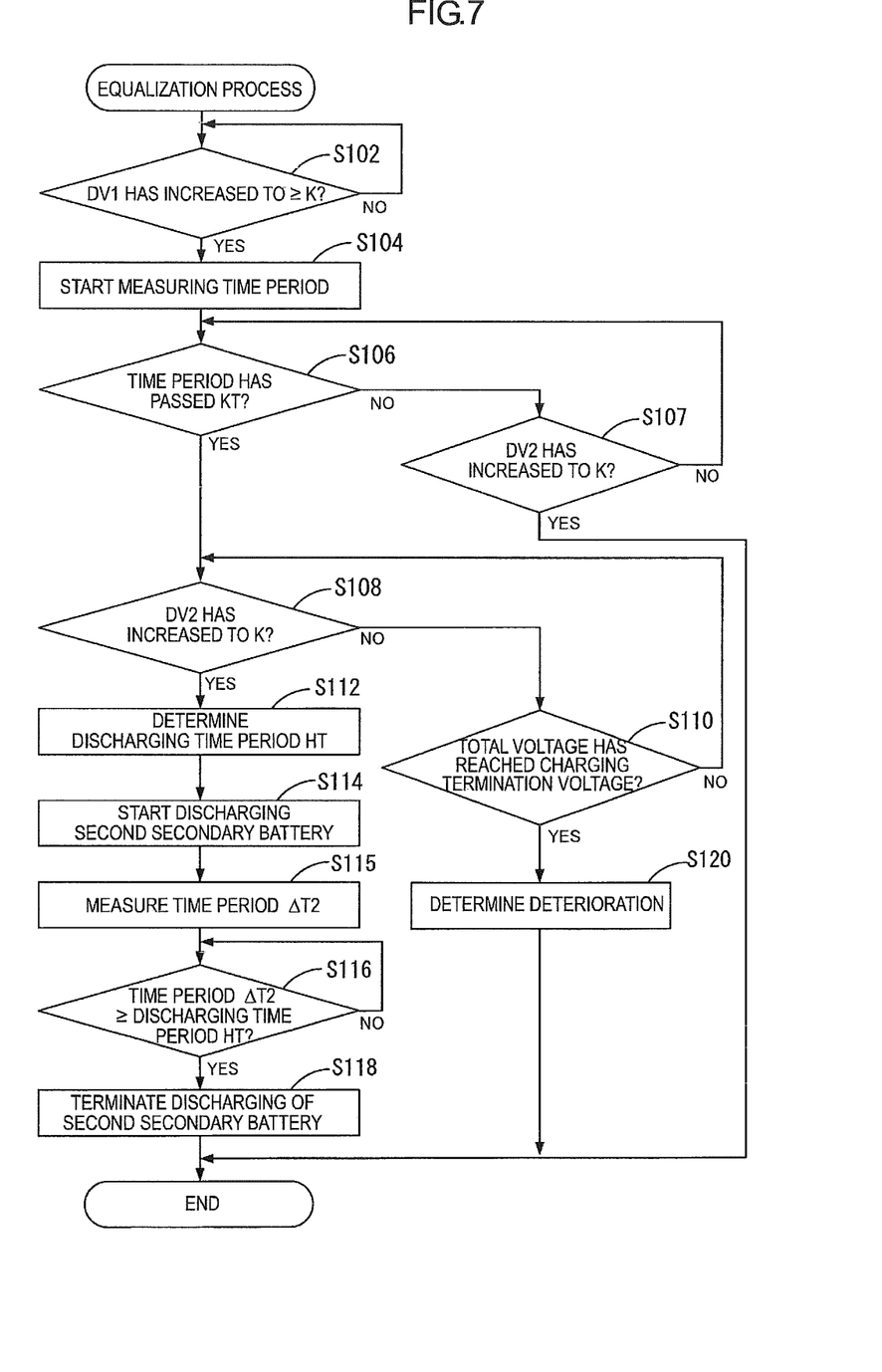
FIG. 7 is a flowchart illustrating an equalizing process according to a second embodiment.

The CPU 30 executes the equalization process according to a flowchart illustrated in FIG. 7. The CPU 30 monitors the unit time variation DV2 of the second secondary battery 50 and a total voltage of the second batteries 50.

The CPU 30 determines whether the unit time variation DV1 has increased to the reference value K (S102). If the unit time variation DV1 has not increased to the reference value K (NO in S102), the CPU 30 continues monitoring the unit time variation DV1. If the unit time variation DV1 has increased to the reference value K (YES in S102), the CPU 30 starts measuring a time period (S104).

The CPU 30 determines whether the elapsed time period has not passed the reference time period KT (S106). If the elapsed time period has passed the reference time period KT (NO in S106), the CPU determines whether the unit time variation DV2 has increased to the reference value K (S107). If the unit time variation DV2 has not increased to the reference value K (NO in S107), the CPU 30 continues monitoring the elapsed time period. If the unit time variation DV2 has increased to the reference value K (YES in S107), the CPU 30 determines that the first secondary battery 50 and the second secondary battery 50 are equally charged. Then, the CPU 30 terminates the equalization process without discharging the first and the second batteries 50.

If the elapsed time period has passed the reference time period KT (YES in S106), the CPU 30 determines whether the unit time variation DV2 of the second secondary battery 50 has increased to the reference value K (S108). If the unit time variation DV2 has not increased to the reference value K (NO in S108), the CPU 30 determines whether the total voltage of the secondary battery 50 has reached the discharging termination voltage (S110). If the total voltage has not reached the discharging termination voltage (NO in S110), the CPU 30 continues monitoring the unit time variation DV2. If the total voltage has reached the discharging termination voltage (YES in S110), the CPU 30 determines that deterioration of the first secondary battery 50 has progressed further than the second secondary battery 50 and the battery assembly 12 has reached the end of lifetime (S120). The CPU 30 issues a warning to notify a user of the deterioration of the battery assembly 12 and battery replacement through a display or any other warning device. Then, the CPU 30 determinates the equalization process.

If the unit time variation DV2 has increased to the reference value K (YES in S108), the CPU 30 determines that the first secondary battery 50 and the second secondary battery 50 are not equally charged. The CPU 30 determines a discharging time period HT for which the second secondary battery 50 is discharged to equalize the SOCs of the first secondary battery 50 and the second secondary battery 50 (S112).

The CPU 30 controls the discharging circuit 26 to discharge the second secondary battery 50 for the determined discharging time period HT. Specifically, the CPU 30 controls the discharging circuit 26 to start discharging the second secondary battery 50 (S114). The CPU 30 measures the time period ΔT2 since the discharging of the second secondary battery has started (S115). The CPU 30 determines whether the time period ΔT2 has passed the discharging time period HT (S116). If the time period ΔT2 has not passed the discharging time period HT (NO in S116), the CPU 30 continues monitoring the time period ΔT2. If the time period ΔT2 has passed the charging time period HT (YES in S116), the CPU 30 controls the discharging circuit 26 to terminate the discharging of the second secondary battery 50 (S118), and terminates the equalization process.

2. Effects (1) The BMS 20 determines the unit time variation DV of the secondary battery 50 under discharging and calculates the time period ΔT1 based on the unit time variation DV. The BMS 20 controls the equalization of the secondary batteries 50 using the time period ΔT1. With the BMS 20, the secondary batteries 50 can be discharged at an equalized SOC even in the plateau region.

(2) The olivine-type lithium-ion iron secondary batteries are used in the charging and discharging system 10. These batteries have a plateau region that extends from a point at which the SOC is 10% to a point at which the SOC is 90%. In a region in which the SOC is lower than 10%, that is, in a final stage of discharging, the battery voltage sharply drops for a slight decrease in SOC. If the equalization is performed on the secondary batteries 50 based on the voltage V, the SOC tends to quickly reach substantially 0% because only a slight decrease is required to reach 0%. Therefore, the equalization process cannot be complete for the secondary batteries 50. The plateau region may be preferable to be used for the equalization of the secondary batteries 50 because the SOC is higher in the plateau region than in the final stage of discharging.

The BMS 20 controls the discharging of the secondary batteries 50 using the unit time variation DV rather than the voltage V of the second batteries 50. The equalization of the secondary batteries 50 can be completed by a single equalization process using the plateau region and the secondary batteries 50 can be discharged.

(3) According to the BMS 20, the second secondary battery 50 is discharged if the time period ΔT1 is equal to or longer than the reference time KT. Therefore, the difference in SOC between the first secondary battery 50 and the second secondary battery 50 during the discharging of the battery assembly 12 is maintained within a certain capacity variation corresponding to the reference time period KT.

(4) The BMS 20 determines that the first secondary battery 50 and the second secondary battery 50 are not equally discharged if the time period ΔT1 is equal to or longer than the reference time period KT. Under such a condition, the second secondary battery 50 is discharged. Therefore, the secondary batteries 50 in the battery assembly 12 under charging can be equally discharged.

(5) The total voltage of the secondary batteries 50 may reach the charging termination voltage and the charging may be terminated before the unit time variation DV2 of the second secondary battery 50 increases to the reference value K. In such a case, the BMS 20 determines that the first secondary battery 50 may be deteriorated and the SOCs of the first secondary battery 50 and the second secondary battery 50 cannot be equalized. Therefore, the battery assembly 12 including the deteriorated secondary battery 50 is less likely to be used.

Third Embodiment

A third embodiment will be explained with reference to FIG. 8. The charging and discharging system 10 is configured to determine a discharging time period HT for each secondary battery 50 based on discharging time period data stored in a memory 32 in advance. Other configurations are the same as those of the first embodiment and will not be explained.

1. Equalization Process

Figure 8:
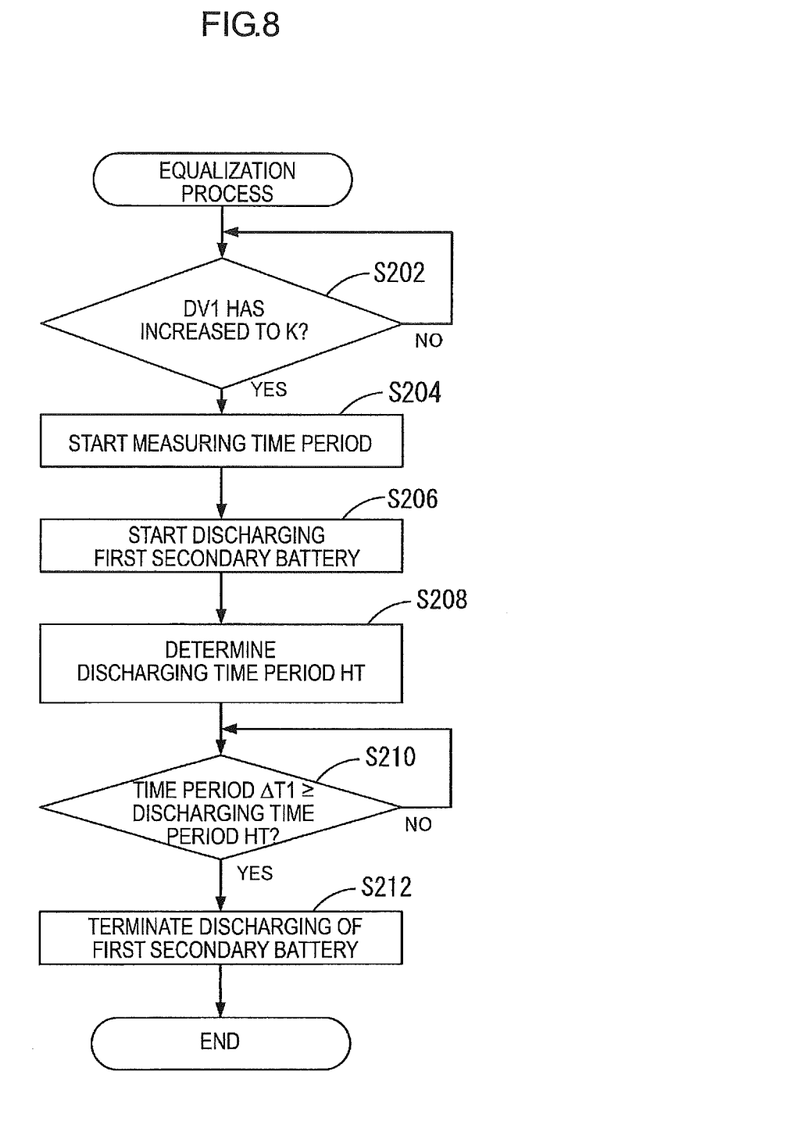
FIG. 8 is a flowchart illustrating an equalizing process according to a third embodiment.

An equalization process is executed according to the flowchart illustrated in FIG. 8. The CPU 30 determines whether the unit time variation DV1 of the first secondary battery 50 has increased to the reference value K (S202). If the unit time variation DV1 has not increased to the reference value K (NO in S202), the CPU 30 continues monitoring the unit time variation DV1. If the unit time variation DV1 has increased to the reference value K (YES in S202), the CPU 30 starts measuring the elapsed time period since the unit time variation DV1 has increased to the reference value K (S204). Moreover, the CPU 30 controls the discharging circuit 26 to start discharging the first secondary battery 50 (S206). The CPU 30 determines a sequence of the secondary batteries 50 including the first and the second secondary batteries 50 according to time at which the unit time variations DV of the secondary batteries 50 have increased to the reference value K. The CPU 30 stores sequential numbers of the sequence in the memory 32.

The CPU 30 determines the discharging time period HT for each secondary battery 50 based on the sequential numbers and a relational table illustrated in FIG. 1 (S208). Specifically, the CPU 30 assigns sequential numbers to the electric storage devices according to the sequence. The relational table stored in the memory 32 includes the sequential numbers and the discharging time periods HT associated with each other. The discharging time period HT becomes longer as the sequential number becomes larger. The CPU 30 select the discharging time period HT assigned to the first electric storage device 50 from the stored discharging time periods HT stored in the memory 32 according to the sequential number of the first secondary battery 50. The CPU 30 controls the discharging circuit 26 to discharge the first secondary battery 50 for the selected discharging time period HT.

Specifically, the CPU 30 determines whether the elapsed time period $\Delta T1$ has passed the discharging time period (S210). If the elapsed time period $\Delta T1$ has not passed the discharging time period (NO in S210), the CPU 30 continues monitoring the elapse time period $\Delta T1$. If the elapsed time period $\Delta T1$ has passed the discharging time period (YES in S210), the CPU 30 controls the discharging circuit 26 to terminate the discharging of the first secondary battery 50 (S212), and terminates the equalization process.

The charging and discharging system 10 charges the battery assembly 12 for multiple times. Namely, the CPU 30 executes the charging control process and the equalization process for multiple times. In every equalization process, the CPU 30 uses the discharging time period data stored in the memory 32.

2. Effects (1) If the unit time variation DV of the secondary battery under charging has increased to the reference value K, the BMS starts discharging the first secondary battery 50. Therefore, the discharging of the first secondary battery 50 can be started before the unit time variations of the other second batteries 50 have increased to the reference value K. Namely, the discharging of the first secondary battery 50 can be started earlier in the equalization process during the charging of the battery assembly 12.

(2) The BMS 20 determines the discharging time periods HT of the secondary batteries 50 based on the sequence and the discharging time period data stored in the memory 32 in advance. The sequence is determined according to the time at which the unit time variations DV of the secondary batteries 50 have increased to the reference value K. With such a configuration, the discharging time periods of the secondary batteries can be easily and promptly determined.

Fourth Embodiment

A fourth embodiment will be described with reference to FIG. 9. An equalization process executed by the charging and discharging system 10 associated with the discharging control process will be explained.

In this embodiment, the point KS1 will be used. As in the first embodiment or the third embodiment, the secondary battery 50, the unit time voltage DV of which has increased to the reference value K the fastest, may be referred to as a first secondary battery 50. Furthermore, the secondary battery 50, the unit time voltage DV of which has increased to the reference value K the slowest, may be referred to as a second secondary battery 50. The same configurations as the first embodiment or the third embodiment will not be explained.

1. Equalization Process

Figure 9:
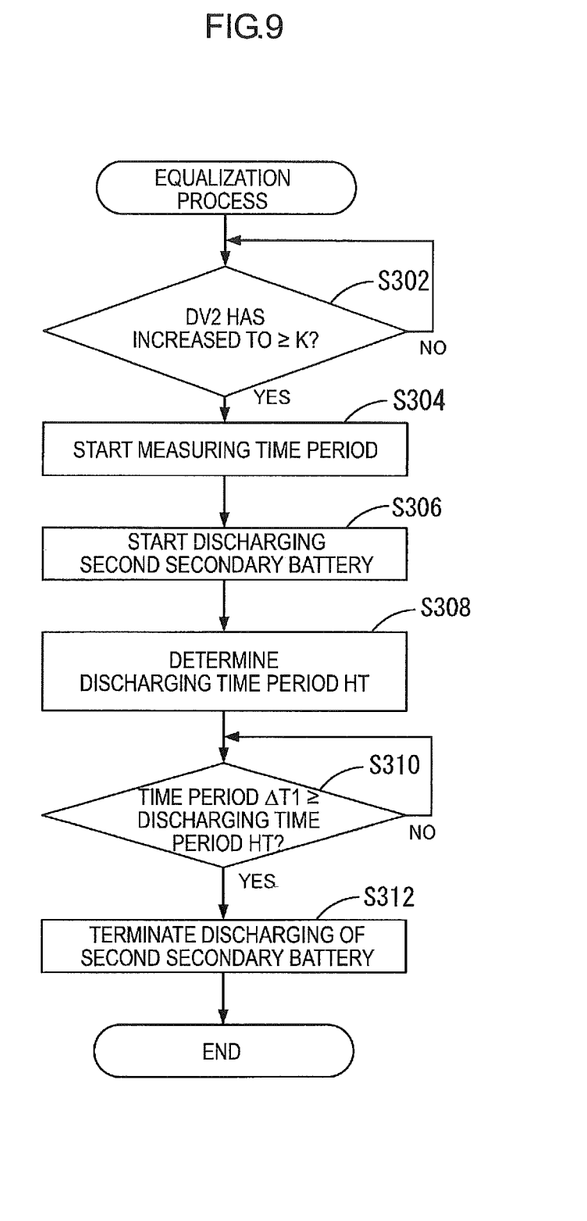
FIG. 9 is a flowchart illustrating an equalizing process according to a fourth embodiment.

The equalization process is executed according to a flowchart illustrated in FIG. 9. The CPU 30 determines whether the unit time variation DV2 has increased to the reference value K (S302). If the unit time variation DV2 has not increased to the reference value K (NO in S302), the CPU 30 continues monitoring the unit time variation DV2. If the unit time variation DV2 has increased to the reference value K (YES in S302), the CPU 30 measures the elapse time period since the unit time variation DV2 has increased to the reference value K (S304). Moreover, the CPU 30 controls the discharging circuit 26 to start discharging the second secondary battery 50 (S306).

The CPU 30 determines a sequence of the secondary batteries 50 according to time at which the unit time variations DV of the secondary batteries 50 have increased to the reference value K. The CPU 30 stores sequential numbers of the sequence in the memory 32.

The CPU 30 determines the discharging time period HT for each secondary battery 50 based on the sequential numbers and a relational table (S308). The CPU 30 select the discharging time period HT from the stored discharging time periods HT in the memory 32 according to the sequential number of the second secondary battery 50. The CPU 30 controls the discharging circuit 26 to discharge the second secondary battery 50 for the selected discharging time period HT. The relational table stored in the memory 32 includes the sequential numbers and the discharging time periods HT associated with each other. The discharging time period HT becomes longer as the sequential number becomes smaller.

2. Effects

The BMS 20 can start charging the secondary batteries 50 under charging earlier in comparison to a known configuration. Namely, the discharging of the second secondary battery can be started earlier in the equalization process for the battery assembly 12 under discharging.

Other Embodiments

The present invention is not limited to the embodiment described above with reference to the description and drawings; for example, the following various embodiments will also be included in the technical scope of the invention.

(1) The charging and discharging system 10 may include multiple CPUs and BMSs for measuring the time periods, and executing the equalization process and other processes, respectively. Alternatively, the charging and discharging system 10 may include devices configured to individually perform the above functions.

(2) The above configurations may be applied to any type of batteries having a negative electrode including a graphite-based material or ones that do not have the plateau region.

For those batteries, the reference value K may be determined based on the charging and discharging characteristics of the batteries.

(3) The secondary batteries 50 may be charged or discharged through constant power charging or constant power discharging.

(4) The battery assembly 12 may be used in different applications other than electric vehicles.

(5) The elapsed time period ΔT may be measured since the start of the charging control process or the discharging control process rather than since the time when the unit time variation DV of any one of the secondary batteries 50 has increased to the reference value K. Namely, the CPU 30 may start measuring the time period from when the charging control process or the discharging control process has started to when the unit time variation DV has increased to the reference value K. Then, the CPU 30 determines the time period as the elapsed time period ΔT.

(6) Instead of discharging the first secondary battery 50 after the discharging time period HT is determined in the first embodiment, the discharging may be started before the discharging time period HT is determined. For example, the equalization process may be executed according to a flowchart illustrated in FIG. 10.

Figure 10:
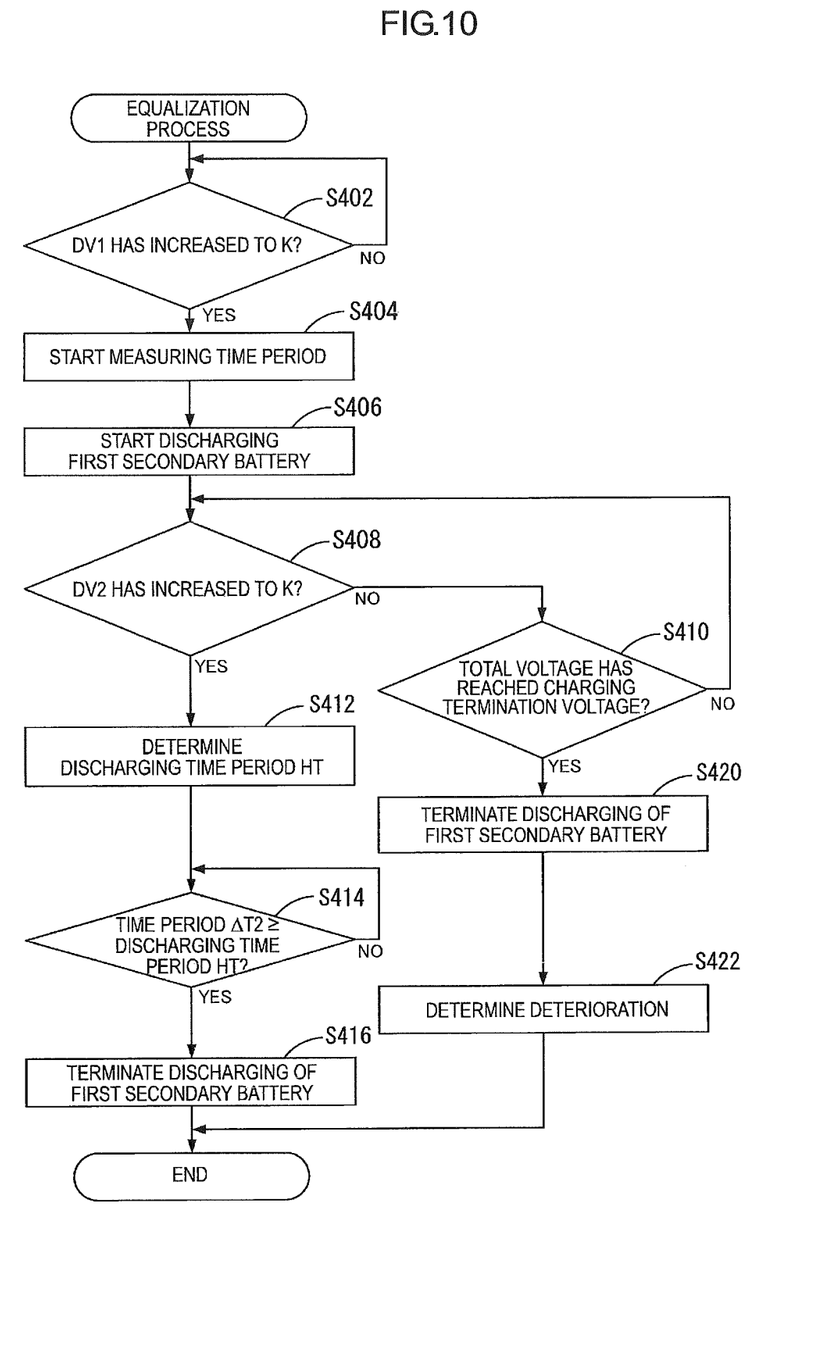
FIG. 10 is a flowchart illustrating an equalizing process according to one of other embodiments.

The CPU 30 determines whether the unit time variation DV1 of the first secondary battery 50 has increased to the reference value K (S402). If the unit time variation DV1 has not increased to the reference value K (NO in S402), the CPU 30 continues monitoring the unit time variation DV1. If the unit time variation DV1 has increased to the reference value K (YES in S402), the CPU 30 starts measuring the elapsed time period since the unit time variation DV1 has increased to the reference value K (S404). Moreover, the CPU 30 controls the discharging circuit 26 to start discharging of the first secondary battery 50 (S406).

The CPU 30 monitors the unit time variation DV2 of the second secondary battery 50 and the total voltage of the voltages V of the secondary batteries 50. Specifically, the CPU 30 determines whether the unit time variation DV2 has increased to the reference value K (S408). If the unit time variation DV2 has increased to the reference value K (YES in S408), the CPU 30 determines the discharging time period HT for which the first secondary battery 50 has discharged (S412). The CPU 30 determines whether the elapsed time period ΔT2 has passed the discharging time period HT (S414). The elapsed time period ΔT2 is measured since the switch Q of the one of the discharging circuits 26A to 26N for the first secondary battery 50 is closed. If the elapsed time period ΔT2 has not passed the discharging time period HT (NO in S416), the CPU 30 continues monitoring the elapsed time period ΔT2. If the elapsed time period ΔT2 has passed the discharging time period HT (YES in S416), the CPU 30 controls the discharging circuit 26 to terminate the discharging of the first secondary battery 50 (S416).

If the unit time variation DV2 has not increased to the reference value K (NO in S408), the CPU 30 determines whether the total voltage has reached the charging termination voltage (S410). If the total voltage has not reached the charging termination voltage (NO in S410), the CPU 30 continues monitoring the unit time variation DV2. If the total voltage has reached the charging termination voltage (YES in S410), the CPU 30 controls the discharging circuit 26 to terminate the discharging of the first secondary battery 50 (S420). Moreover, the CPU 30 determines that the deterioration of the second secondary battery 50 has progressed further than the first secondary battery 50 (S422). The CPU 30 issues a warning to notify a user of the deterioration of the battery assembly 12 and battery replacement through a display or any other warning device. Then, the CPU 30 determinates the equalization process.

(7) A termination voltage may be set for each secondary battery 50 and the end of lifetime of the assembly battery 12 may be determined if any of the secondary batteries 50 has reached the termination voltage. The voltage V of the first secondary battery 50 may reach the charging limit voltage (the charging termination voltage) before the unit time period DV2 of the second secondary battery 50 has increased to the reference value K after the unit time variation DV1 of the first secondary battery has reached to the reference value K. In such a case, the end of lifetime of the battery assembly 12 may be determined.

(8) The discharging time period HT may be determined differently from the first and the second embodiments. For example, a charging/discharging current ZI to or from the battery assembly 12 may be measured and a capacity difference ΔY may be determined based on a multiplication of the elapsed time period ΔT and the charging/discharging current ZI. The equalization control current HI flows when the switch Q is closed. The discharging time period HT may be calculated by dividing the capacity difference ΔY by the equalization control current HI.

$$HT=\Delta Y/HI \qquad (1)$$

Alternatively, the discharging time period may be determined based on a predetermine time period ΔT.

What is claimed is:

1. A method for equalizing capacities of electric storage devices that are connected in series in an electric storage device assembly charged and discharged by a charger/discharger, the method comprising:
    charging/discharging the electric storage device assembly at a charging/discharging rate of 1 C or lower;
    individually measuring voltages of the electric storage devices, respectively;
    determining whether a time rate of change in voltage of one electric storage device of the electric storage devices has reached a time-rate-of-change reference value and then a time rate of change in voltage of another electric storage device of the electric storage devices has reached the time-rate-of-change reference value;
    individually discharging, based on a determining result, the electric storage device by a discharging circuit provided separately from the discharger;
    determining whether the electric storage device assembly is under charging;
    measuring an elapsed time period since the time rate of change in voltage of the one electric storage device has reached the time-rate-of-change reference value; and
    measuring a time period from when the time rate of change in voltage of a first electric storage device has reached the time-rate-of-change reference value to when the time rate of change in voltage of a second electric storage device has reached the time-rate-of-change reference value if the electric storage device assembly is under charging and the elapsed time period has passed a reference time.

2. The method according to claim 1, wherein the charging/discharging rate at the charging/discharging is lower than 0.9 C.

3. The method according to claim 1, further comprising:
    determining a discharging time period based on the measured time period; and discharging the first electric storage device for the determined discharging time period.

4. The method according to claim 1, further comprising:
determining a sequence of the electric storage devices determined based on time points at which the time rate of change in voltages of the electric storage devices have reached the time-rate-of-change reference value; and
determining discharging time periods for the electric storage devices based on the sequence.

5. A method for equalizing capacities of electric storage devices that are connected in series in an electric storage device assembly charged and discharged by a charger/discharger, the method comprising:
charging/discharging the electric storage device assembly at a charging/discharging rate of 1 C or lower;
individually measuring voltages of the electric storage devices, respectively;
determining whether a time rate of change in voltage of one electric storage device of the electric storage devices has reached a time-rate-of-change reference value and then a time rate of change in voltage of another electric storage device of the electric storage devices has reached the time-rate-of-change reference value;
individually discharging, based on a determining result, the electric storage device by a discharging circuit provided separately from the discharger;
determining whether the electric storage device assembly is under discharging;
measuring an elapsed time period since the time rate of change in voltage of the one electric storage device has reached the time-rate-of-change reference value; and
measuring a time period from when the time rate of change in voltage of a first electric storage device has reached the time-rate-of-change reference value to when the time rate of change in voltage of a second electric storage device has reached the time-rate-of-change reference value if the electric storage device assembly is under discharging and the elapsed time period has passed a reference time.

6. The method according to claim 5, further comprising:
determining a discharging time period based on the measured time period; and
discharging the second electric storage device for the determined discharging time period.

7. The method according to claim 5, further comprising:
determining a sequence of the electric storage devices determined based on time points at which the time rate of change in voltages of the electric storage devices have reached the time-rate-of-change reference value; and
determining discharging time periods for the electric storage devices based on the sequence.

* * * * *